(12) United States Patent
Malausa et al.

(10) Patent No.: US 7,730,930 B2
(45) Date of Patent: Jun. 8, 2010

(54) DEVICE FOR FIXING A PULLEY

(75) Inventors: Andrea Malausa, Ponti di Piave (IT); Lorenzo Galberti, Musile di Piave (IT)

(73) Assignee: Nice Spa, Oderzo (IT)

( * ) Notice: Subject to any disclaimer, the term of this patent is extended or adjusted under 35 U.S.C. 154(b) by 0 days.

(21) Appl. No.: 11/757,506

(22) Filed: Jun. 4, 2007

(65) Prior Publication Data
US 2008/0000596 A1   Jan. 3, 2008

(51) Int. Cl.
E06B 9/72 (2006.01)
(52) U.S. Cl. ..................... 160/310; 403/109.3
(58) Field of Classification Search .............. 160/323.1, 160/324, 325, 326, 903, 310, 311, 370.22, 160/188; 403/109.1, 369, 109.2, 109.3, 374.4; 242/390, 390.8; 310/66, 67 R, 75 R, 83; 411/45, 46, 47, 48; 24/458, 292, 616
See application file for complete search history.

(56) References Cited

U.S. PATENT DOCUMENTS

| | | | | |
|---|---|---|---|---|
| 3,163,109 | A * | 12/1964 | Stelling, Jr. .................. | 101/219 |
| 3,285,089 | A * | 11/1966 | Tsugawa ................... | 74/421 R |
| 3,794,436 | A * | 2/1974 | Rowlett ....................... | 408/124 |
| 3,888,134 | A * | 6/1975 | Miranda ...................... | 74/405 |
| 3,957,381 | A | 5/1976 | Schafer | |
| 4,247,216 | A * | 1/1981 | Pansini ..................... | 403/109.3 |
| 4,342,354 | A * | 8/1982 | Leivenzon et al. .......... | 160/133 |
| 4,399,857 | A * | 8/1983 | Honma .................... | 160/323.1 |
| 4,735,140 | A * | 4/1988 | Wieland et al. ............. | 101/230 |
| 4,751,953 | A * | 6/1988 | Appel et al. ................. | 160/313 |
| 4,844,140 | A * | 7/1989 | Jones et al. .................. | 160/310 |
| 4,927,287 | A * | 5/1990 | Ohkawa et al. .......... | 403/408.1 |
| 5,205,332 | A * | 4/1993 | Lii ............................ | 160/23.1 |
| 5,351,743 | A * | 10/1994 | Jackson ...................... | 160/310 |
| 5,676,415 | A * | 10/1997 | Ament et al. ............. | 296/37.16 |
| 5,813,449 | A * | 9/1998 | Patmore et al. ........ | 160/370.22 |
| 5,924,949 | A * | 7/1999 | Fan ............................ | 475/149 |

(Continued)

FOREIGN PATENT DOCUMENTS

DE   101 55 167   5/2003

(Continued)

OTHER PUBLICATIONS

International Search Report and Written Opinion of the International Searching Authority dated Mar. 31, 2006, from the corresponding International Application.

*Primary Examiner*—David Purol
(74) *Attorney, Agent, or Firm*—Katten Muchin Rosenman LLP

(57) ABSTRACT

A device (10) for fixing a pulley (40) includes a rotating pin (12) on the outer surface of which the pulley (40) may be fixed. The rotating pin (12) has at least one locking element (50) movable between a first locking position where it retains the pulley (40) and a second releasing position where it does not retain it. The locking element (50) is coupled with at least one element (60) which can be operated by the user so that the displacement of said at least one element (60) which can be operated by the user causes the displacement of the at least one locking element (50) between the first and second position.

18 Claims, 2 Drawing Sheets

U.S. PATENT DOCUMENTS

| | | | | |
|---|---|---|---|---|
| 5,961,172 | A * | 10/1999 | Ament et al. | 296/37.16 |
| 6,688,447 | B1 * | 2/2004 | Liu | 192/139 |
| 2003/0015301 | A1 * | 1/2003 | Killo et al. | 160/310 |
| 2004/0045683 | A1 * | 3/2004 | Carrillo et al. | 160/310 |

FOREIGN PATENT DOCUMENTS

| | | |
|---|---|---|
| EP | 0 292 259 | 11/1988 |
| JP | 2003-206915 | 7/2003 |

* cited by examiner

DEVICE FOR FIXING A PULLEY

CROSS-REFERENCE TO RELATED APPLICATIONS

This application claims priority to International Application PCT/EP/2005/056377, which was filed Dec. 1, 2005. This application claims priority to Italian Application TV2004U000065 filed Dec. 7, 2004.

The invention relates to a device for fixing a pulley, intended in particular for gearmotors used in roller blinds.

BACKGROUND OF THE INVENTION

1. Field of the Invention

In very many applications it is required to employ pulleys in order to transmit a rotating movement, raise loads, vary the direction of a cable, etc.

2. Description of the Related Art

Normally the pulleys (or generally a rotating wheel) are fixed to the pin on which they rotate either permanently or otherwise via fixing means which range from split pins to bolt-type fastening systems. Not infrequently the pulley must be removed from the pin by means of a very quick and simple operation, for example so as to replace it with a different pulley.

An example of this arises in the sector of tubular gearmotors to which reference will now be made by way of example.

Tubular gearmotors for moving and/or automating roller blinds, such as shutters, blinds and curtains, at present are designed in such a way that they may be inserted inside a winding drum on which the said shutter is wound (and unwound). They comprise principally an electric motor, a speed reducer and a capacitor, which are housed inside a tubular body. Two pulleys for transmission of the rotating movement from the gearmotor to the winding drum are provided at the ends of the metallic tubular body.

The transmission pulleys have a grooved external profile which matches the internal form of the winding drum. The first pulley is mounted on an output pin of the gearmotor, while the second pulley is mounted on the end-of-travel mechanism. The invention relates to the first pulley.

Usually this pulley is fixed to the rotating pin either with permanent fixing means (screws, washers, etc.) or by means of a tongue arranged on the rotating pin. The tongue engages inside a corresponding seat of the pulley once the latter has been inserted on the pinion. The pulley also has, formed in it, a groove inside which a screwdriver can be inserted in order to lower the tongue and extract the pulley from the pinion.

This solution has the disadvantage that the pulley replacement operation requires precisely the insertion of a screwdriver, for which the installation operator must use one hand, while with the other hand the pulley must be removed.

If one considers that very often replacement is performed once the gearmotor has been installed and therefore in a position which is not easily accessible (for example inside the recess of a wall reached by means of a ladder), it is easy to appreciate the awkward nature of this operation and the danger of not being able to hold on with at least one hand.

SUMMARY OF THE INVENTION

The main object of the invention is to provide a fixing device for a pulley which can be easily released.

This object is achieved with a device for fixing a pulley comprising a rotating pin on the outer surface of which the pulley may be fixed, said rotating pin having at least one locking element movable between a first locking position were the pulley is retained and a second releasing position where it is not retained, characterized in that said at least one locking element is coupled with at least one element which can be operated by a user, the displacement of said at least one element which can be operated by the user causing the displacement of said at least one locking element between said first and second position.

BRIEF DESCRIPTION OF THE DRAWING

The advantages and characteristic features of the present invention will emerge more clearly from the following description of an embodiment to be regarded solely as being an example The description refers to the accompanying drawing in which.

DETAILED DESCRIPTION OF THE INVENTION

Figure 1:
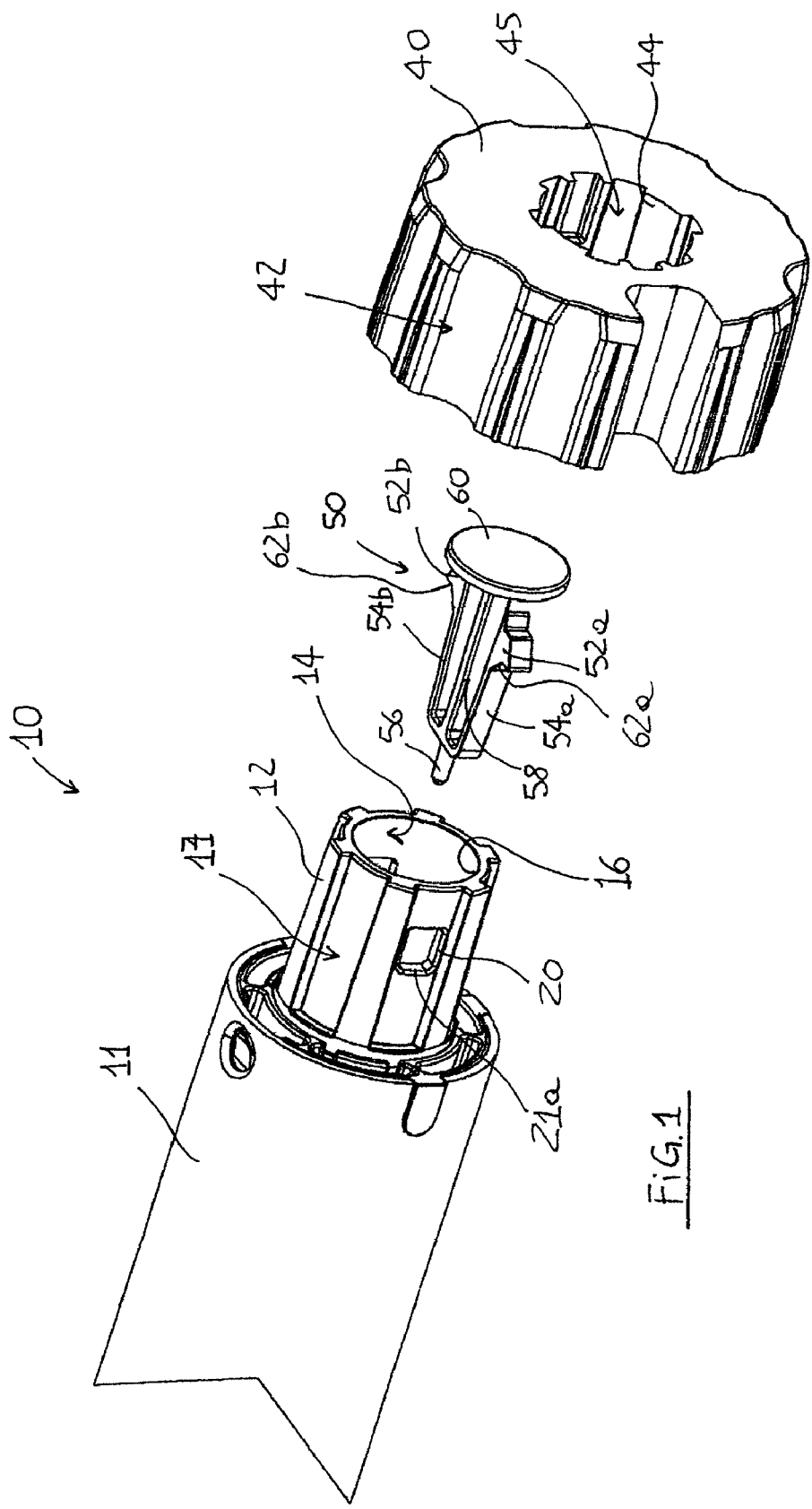
FIG. 1 shows a partial three-dimensional view of a gearmotor which uses a device for fixing a pulley according to the invention.

In the figures a fixing device 10 according to the invention is mounted on a gearmotor 11. The device 10 comprises, at one end, a rotating pin 12 with grooves 17 having a cylindrical coaxial cavity 14 which opens outwards at a free end of the rotating pin 12. Said cavity 14 has a side surface 16 and a bottom surface 18.

The rotating pin 12 is coupled to a motor via a reducer (not shown) of the gearmotor 11 and has the function of transferring the rotational movement thereof. A pulley 40 (see FIG. 1) has an outer toothing 42 shaped so as to mesh with the inner part of the winding drum of the roller blind when operated (not shown) and an inner toothing 44 formed in a central through-hole 45 and corresponding to the groove 17 of the rotating pin 12 on which it is to be mounted. The toothing 44 comprises, in diametrically opposite positions, two longitudinal grooves 46a,b which extend from one edge of the toothing 44 over about half the depth of the latter.

The cavity 14 of the rotating pin has, on the side surface 16, two diametrically opposite holes 20, 22 with inner lying edges 21a, 21b, while in the centre of the bottom surface 18 it has a bush 24 formed raised from the bottom surface 18.

A locking element 50 (see FIG. 1) has a symmetrical form (so that suffixes "a" and "b" will be used for identical parts) and comprises two locking teeth 52a,b situated at one end of two diverging arms 54a,b which are curved at the other end so as to form a kind of "V". A pin 56 and a nail-shaped body 58 with a head 60 extend from the centre of the "V". The locking teeth 52a,b are connected to the arms 54a,b by means of two inclined segments 62a,b.

Figures 2, 3:
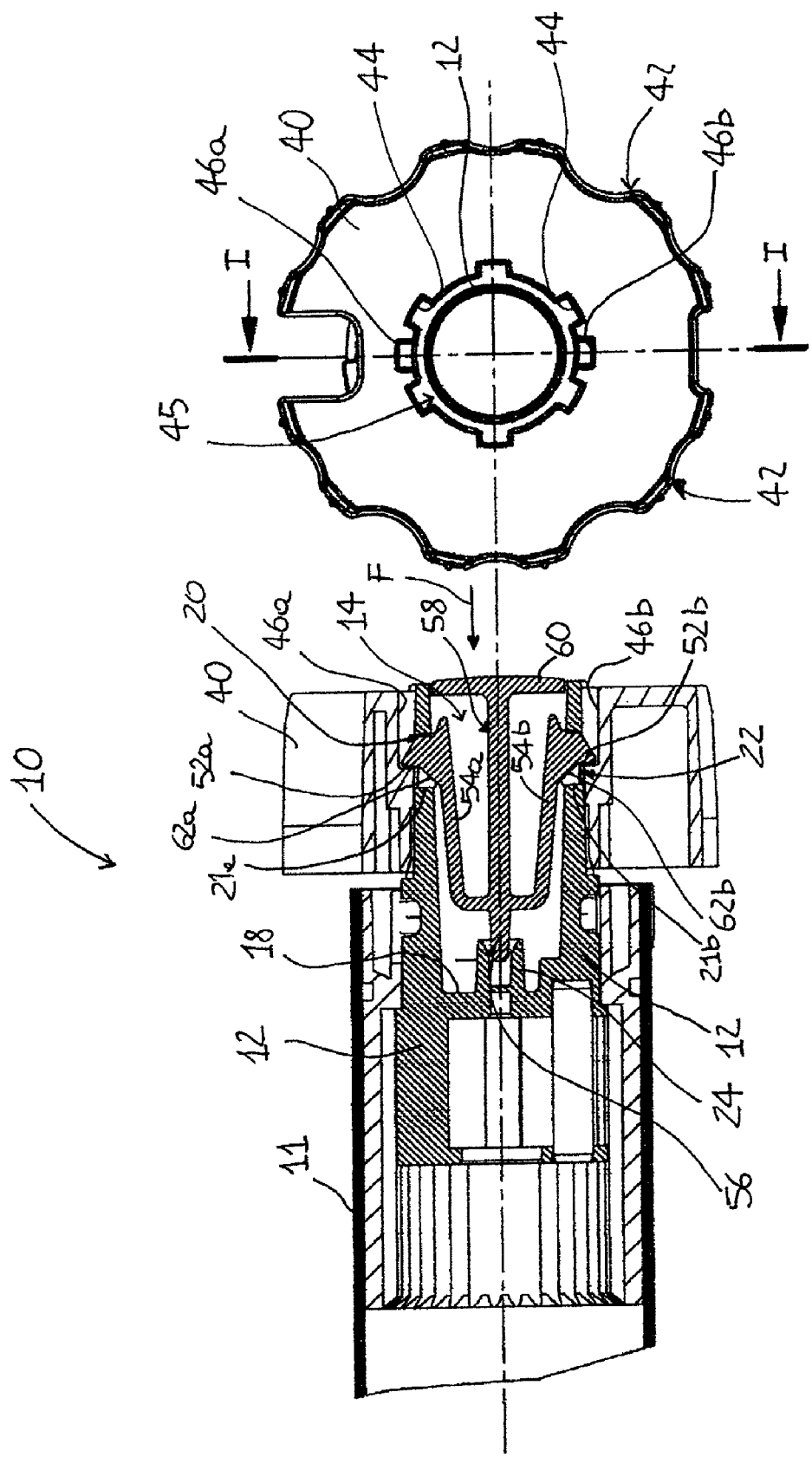
FIG. 2 shows a front view of a pulley of the fixing device according to FIG. 1.
FIG. 3 shows a cross-sectional view of the fixing device according to FIG. 1 along the cross-sectional plane I-I of FIG. 2.

The locking element 50 is inserted inside the cavity 14, as can be seen in FIG. 3. In particular it can be noted that the pin 56 is engaged inside the bush 24, but has the possibility of performing a further travel movement inside it, and the head 60 closes the cavity 14, being able, however, to slide along its side surface 16. Moreover, the locking teeth 52a,b protrude from the holes 20,22 and the inclined segments 62a,b bear against the edges 21a,b of the holes 20, 22. Obviously, in order to obtain this configuration, the dimensions of the various parts which form the locking element 50 must be chosen so as to correspond to the dimensions of the cavity 14, the holes 20,22 and the bush 24.

The operating principle of the locking element 50 is now described. Once it has been inserted as described inside the cavity 14, the pulley 40 (see FIG. 3) is mounted on the rotating pin 12 so as to cause engagement of its inner toothing 44 with the grooves 17 of the rotating pin 12 and produce alignment of the holes 20, 22 with the grooves 46a,b, which remain directed towards the head 60. Then, by pushing the pulley 40 onto the rotating pin 12, initially the locking teeth 52a,b move downwards with respect to the groove 17 inside the holes 20, 33 since they are pushed by the toothing 44 of the pulley 40, but move back upwards, owing to the elasticity of the arms 54a,b, when they are reached by the two longitudinal grooves 46a,b of the pulley 40, and are arranged inside said two longitudinal groves 46a,b. It can be seen from FIG. 3 that the pulley 40 is locked on the rotating pin 12 by the teeth 52a,b which bear against one wall of the grooves 46a,b. In order to release the pulley 40, the head 60 is pushed inside the cavity 14, in a direction F shown in FIG. 3. This causes the pin 56 to move inside the bush 24 and pushes the arms 54a,b towards the bottom surface 18 of the cavity 14. Therefore, the inclined segments 62a,b slide on the edges 21a,b of the holes 20, 22 with the effect of retracting the teeth 52a,b inside the cavity 14. Now the pulley 40 is no longer retained and may be removed from the rotating pin 12.

The elasticity of the arms 54a,b produces moreover a "spring" effect in the locking element 50, since, once the head 60—which acts like a pushbutton—is released, it returns into the initial position, bringing the teeth 52a,b into the locked position.

Obviously, the invention may be subject to numerous variations. For example, it is possible to keep the form of the arms 54a,b in the locking element 50, to eliminate the pin 58 and the body 58 and to form an extension for each of the two arms 54a,b which extends outside the cavity 14, instead of the body 58. By moving these two extensions towards it each other, retraction of the teeth 52a,b is obtained. Transmission mechanisms, such as gearwheels or lever systems, may be used between the locking teeth 52a,b and the head 60 (or a generic element which can be operated by a user).

The invention may advantageously be used in many applications, such as, for example, toys (in order to fix/detach wheels or components in models or in the construction sector). All these variations are included within the scope of protection of the following claims.

The invention claimed is:

1. In combination, a gearmotor and a pulley, the gearmotor fixable with the pulley, the combination comprising:
   the gearmotor comprising
      a rotating pin comprising an outer surface for receiving the pulley and a cavity having a bottom surface,
      a locking element received entirely in the cavity, the locking element being movable in the cavity relative to the rotating pin between a first and a second locking position and between the second and first locking position, the first locking position being one where the rotating pin and the pulley are retained together, the second locking position being one where the rotating pin and the pulley are not retained together,
      a plurality of flexible arms disposed on the locking element for biasing the locking element in the first locking position without flaring the rotating pin, each arm comprising a locking tooth disposed at a first end of the respective arm;
      a user-operable element disposed on the locking element for axially moving the locking element relative to the rotating pin from the first to the second locking position inside the cavity responsive to a user.

2. The combination of claim 1,
   wherein the rotating pin comprises an opening, the opening for receiving a portion of the locking element;
   wherein when the locking element is in the first locking position, the portion of the locking element protrudes from the opening beyond the outer surface of the rotating pin;
   wherein when the locking element is in the second locking position, the portion of the locking element does not protrude from the opening.

3. The combination of claim 1, wherein the cavity is co-axial with the rotating pin and comprises an open end.

4. The combination of claim 3, wherein the user-operable element is received in the cavity and moves relative to the rotating pin.

5. The combination of claim 1, wherein the user-operable element is an extension of the locking element.

6. The combination of claim 1, wherein each arm is curved at a second end thereof to form a V-shape with respect to a like arm,
   wherein the locking element further comprises
      a pin,
      a nail-shaped body connected to the user-operable element.

7. The combination of claim 1, wherein the rotating pin comprises an opening, the opening for receiving a portion of the locking tooth;
   wherein when the locking element is in the first locking position, the portion of the locking tooth protrudes from the opening beyond the outer surface of the rotating pin;
   wherein when the locking element is in the second locking position, the portion of the locking tooth does not protrude from the opening.

8. The combination of claim 7,
   wherein the locking element further comprises an inclined segment on each arm and the opening comprises an edge,
   wherein when the user-operable element is pushed by the user, the locking element moves relative from the first to the second locking position causing the inclined segment to bear on the edge.

9. The combination of claim 1,
   wherein the locking element further comprises a end pin,
   wherein the bottom surface comprises a bush, the bush receiving the end pin and holding the end pin while the end pin moves relative to the bush;
   wherein when the user-operable element is pushed by the user, the locking element moves relative from the first to the second locking position causing the end pin to move relative to the bush and the portion of the locking tooth moves relative to the opening so that the rotating pin and the pulley are not retained together.

10. The combination of claim 1, wherein the rotating pin comprises a bush, the bush receiving a portion of the locking element while permitting the locking element to move relative to the bush;
   wherein when the user-operable element is pushed by the user, the locking element moves relative from the first to the second locking position causing the locking element to move relative to the bush so that the rotating pin and the pulley are not retained together.

11. In combination, a gearmotor and a pulley that are easily separable, the combination comprising:

a rotating pin coupled to the gearmotor;

an outer surface of the rotating pin, the rotating pin receiving the pulley on the outer surface;

a locking element received entirely in the rotating pin, the locking element movable relative the rotating pin between a first and a second locking position and between the second and first locking position, the first locking position being one where the rotating pin retains the pulley and the second locking position being one where the rotating pin does not retain the pulley, the locking element comprising a user-operable element for axially moving the locking element from first locking position to the second locking position for easily separating the pulley and the gearmotor; and a plurality of flexible arms disposed on the locking element for biasing the locking element in the first locking position without flaring the rotating pin, each arm comprising a locking tooth disposed at a first end of the respective arm.

12. The combination of claim 11, wherein the rotating pin comprises an opening, the opening for receiving a first portion of the locking tooth;

wherein when the locking element is in the first locking position, the first portion of the locking tooth protrudes from the opening beyond the outer surface of the rotating pin;

wherein when the locking element is in the second locking position, the first portion of the locking tooth does not protrude from the opening.

13. The combination of claim 12, wherein the pulley comprises a groove, the groove for receiving a second portion of the locking tooth;

wherein when the locking element is in the first locking position, the second portion of the locking tooth engages the pulley and retains the pulley relative to the rotating pin;

wherein when the locking element is in the second locking position, the second portion of the locking tooth does not retain the pulley relative to the rotating pin and the pulley and the gearmotor are easily separable.

14. The combination of claim 11, wherein the rotating pin comprises a bush, the bush receiving a portion of the locking element while permitting the locking element to move relative to the bush;

wherein when the user-operable element is pushed by the user, the locking element moves relative from the first to the second locking position causing the locking element to move relative to the bush so that the rotating pin and the pulley are not retained together.

15. In combination, a gearmotor for roller blinds and a pulley; the combination comprising:

a gearmotor comprising a rotating pin having an inner space and an outer surface, the outer surface for receiving a pulley for winding the roller blinds;

a locking element received entirely in the inner space to lock the rotating pin and pulley, the locking element comprising a user-operable head, the locking element being longitudinally displaceable relative to the inner space from a first longitudinal position to a second longitudinal position when a user operates the head, the first longitudinal position causing the rotating pin and a pulley to be longitudinally locked together and the second longitudinal position causing the rotating pin and pulley to be longitudinally disengaged; and a plurality of flexible arms disposed on the locking element for biasing the locking element in the first locking position without flaring the rotating pin, each arm comprising a locking tooth disposed at a first end of the respective arm.

16. The combination of claim 15, wherein the rotating pin comprises an opening, the opening for receiving a first portion of the locking tooth;

wherein when the locking element is in the first locking position, the first portion of the locking tooth protrudes from the opening beyond the outer surface of the rotating pin;

wherein when the locking element is in the second locking position, the first portion of the locking tooth does not protrude from the opening.

17. The combination of claim 16, wherein when the locking element is in the first locking position, a second portion of the locking tooth engages a groove disposed on the pulley and longitudinally locking the pulley and the rotating pin;

wherein when the locking element is in the second locking position, the second portion of the locking tooth permits the pulley and gearmotor to be longitudinally disengaged.

18. The combination of claim 15, wherein the rotating pin comprises a bush, the bush receiving a portion of the locking element while permitting the locking element to move relative to the bush;

wherein when the user-operable element is pushed by the user, the locking element moves relative from the first to the second locking position causing the locking element to move relative to the bush so that the rotating pin and the pulley are not retained together.

* * * * *

UNITED STATES PATENT AND TRADEMARK OFFICE
CERTIFICATE OF CORRECTION

PATENT NO. : 7,730,930 B2
APPLICATION NO. : 11/757506
DATED : June 8, 2010
INVENTOR(S) : Andrea Malausa et al.

Page 1 of 1

It is certified that error appears in the above-identified patent and that said Letters Patent is hereby corrected as shown below:

On the Title Page:
Add

Item -- (63)    Related U.S. Application Data

Continuation of application No. PCT/EP05/56377, filed on Dec. 1, 2005. --

Item -- (30)    Foreign Application Priority Data

Dec. 7, 2004 (IT) ..........................TV2004U000065 --

Signed and Sealed this
Eleventh Day of January, 2011

David J. Kappos
*Director of the United States Patent and Trademark Office*